(12) United States Patent  (10) Patent No.: US 8,350,488 B2
Jin  (45) Date of Patent: Jan. 8, 2013

(54) INTEGRATED BACKLIGHT CONTROL SYSTEM

(75) Inventor: Xiaoping Jin, Orange, CA (US)

(73) Assignee: Microsemi Corporation, Alisa Viejo, CA (US)

( * ) Notice: Subject to any disclaimer, the term of this patent is extended or adjusted under 35 U.S.C. 154(b) by 318 days.

(21) Appl. No.: 12/815,441

(22) Filed: Jun. 15, 2010

(65) Prior Publication Data

US 2010/0327761 A1   Dec. 30, 2010

Related U.S. Application Data

(60) Provisional application No. 61/221,570, filed on Jun. 30, 2009.

(51) Int. Cl.
*H05B 37/00* (2006.01)

(52) U.S. Cl. ......... 315/219; 315/224; 315/307; 315/308

(58) Field of Classification Search .................. 315/224, 315/219, 291, 307, 308, 276, 277, 279
See application file for complete search history.

(56) References Cited

U.S. PATENT DOCUMENTS

| | | | | |
|---|---|---|---|---|
| 5,371,440 | A * | 12/1994 | Liu et al. | ................... 315/209 R |
| 5,615,093 | A | 3/1997 | Nalbant | |
| 7,057,611 | B2 | 6/2006 | Lin et al. | |
| 7,298,099 | B2 * | 11/2007 | Ribarich | ....................... 315/308 |
| 2004/0207339 | A1 | 10/2004 | Lin et al. | |
| 2008/0309244 | A1 | 12/2008 | Hsu | |
| 2009/0146586 | A1 | 6/2009 | Parker et al. | |
| 2009/0160352 | A1 | 6/2009 | Nishida et al. | |

OTHER PUBLICATIONS

Texas Instrument—UCC28070 Data Sheet, Revised Nov. 2008.
ON Semiconductor—NCP1606 Data Sheet, Rev. 7, Dec. 2008.
ON Semiconductor—TND360/D—Rev. 0, Feb. 2009, GreenPoint Reference Document.
Shieh, Jenn-Jong; "A Synchronous Primary-Side Dimming Controller for Cold-Cathode Fluorescent Lamp Ballast"; Journal of Marine Science and Technology, vol. 13, No. 2, pp. 105-111; Published 2005.
Lin, Mu-Shen et al; "Primary-side Dimming Control Driver for Cold-Cathode Fluorescent Lamps"; Electronics Letters vol. 32, No. 15—Jul. 18, 1996—IEEE New York.
Rustom, Khalid et al; "Aysmetric Half Bridge Soft-Switching PFC Converter with Direct Energy Transfer"; IEEE International Symposium on Circuits and Systems 2002, pp. 676-681; IEEE New York.
International Search Report issued by European Patent Office Sep. 13, 2010 for Parallel PCT application PCT/US2010/038567.
Written Opinion of the International Searching Authority issued by European Patent Office Sep. 13, 2010 for Parallel PCT application PCT/US2010/038567.

* cited by examiner

*Primary Examiner* — David H Vu
(74) *Attorney, Agent, or Firm* — Simon Kahn

(57) ABSTRACT

A lighting arrangement constituted of: a power factor correction circuit; a lighting controller operative at an electrical potential consonant with the electric potential of the output of the power factor correction circuit; a switching network, coupled to the output of the power factor correction circuit and to respective outputs of the lighting controller; a transformer, a primary winding of the transformer coupled to the output of the switching network; and at least one luminaire coupled to at least one secondary winding of the transformer and arranged to be driven by the at least one secondary winding, the lighting controller operative to control the switching network via the respective outputs to switchably pass current from the power factor correction circuit through the primary winding, thereby powering the at least one luminaire.

9 Claims, 5 Drawing Sheets

INTEGRATED BACKLIGHT CONTROL SYSTEM

CROSS-REFERENCE TO RELATED APPLICATION

This application claims priority from U.S. Provisional Patent Application Ser. No. 61/221,570 filed Jun. 30, 2009, entitled "Integrated CCFL Backlight Control System, the entire contents of which is incorporated herein by reference.

TECHNICAL FIELD

The present application relates to the field of lighting, and more particularly to an arrangement in which a lighting controller is connected at a voltage potential associated with a power factor correction stage.

BACKGROUND OF THE INVENTION

Fluorescent lamps are used in a number of applications including, without limitation, backlighting of display screens, televisions and monitors. One particular type of fluorescent lamp is a cold cathode fluorescent lamp (CCFL). Such lamps require a high starting voltage (typically on the order of 700 to 1,600 volts) for a short period of time to ionize a gas contained within the lamp tubes and fire or ignite the lamp. This starting voltage may be referred to as a strike voltage or striking voltage. After the gas in a CCFL is ionized and the lamp is fired, less voltage is needed to keep the lamp on.

In liquid crystal display (LCD) applications, a backlight is needed to illuminate the screen so as to make a visible display. Backlight systems in LCDs or other applications typically include one or more CCFLs and an inverter system to provide both DC to AC power conversion and control of the lamp brightness. Even brightness across the panel and clean operation of inverters with low switching stresses, low EMI, and low switching losses is desirable. While CCFL backlighting is common, other fluorescent lamps such as external electrode fluorescent lamps (EEFLs) or flat fluorescent lamp (FFLs) may be utilized in place of CCFLs, with somewhat similar requirements. With the increasing size of LCDs and the high screen brightness requirements for better display quality, the power consumption of the backlight system becomes a major factor in the total system power consumption of an LCD based monitor or television.

While the above has been described in relation to a CCFL or other fluorescent lamp, various LCD based monitors are also produced utilizing Light Emitting Diodes (LED) s to provide a backlight system. These LED based systems may be constituted of white LEDs or a plurality of colored LEDs controlled to provide an apparent white light. The term luminaire is used herein to describe a light source, irrespective of whether it is fluorescent light based or LED based, without limitation.

In prior art systems, the incoming power line voltage is first rectified, and a power factor corrector (PFC) is typically provided. The rectified voltage is then converted to a low voltage, typically on the order of 24 volts, and the low voltage is fed to a backlight controller. The backlight controller controls a switching network connected to the primary side of a transformer, and the luminaires are connected to the secondary side of the transformer. The backlight controller is operative to produce the necessary AC driving voltage by controlling the operation of the individual switches of the switching network. Such an operation is described, for example, in U.S. Pat. No. 5,615,093 issued Mar. 27, 1997 to Nalbant, the entire contents of which is incorporated herein by reference.

Unfortunately, the above architecture leads to excessive power loss, since an incoming AC line voltage is first converted to a high voltage DC, the high voltage DC is then converted to a low voltage DC, and the low voltage DC is then again converted to a higher AC voltage for driving the luminaires. In a move to reduce power consumption, an architecture called LCD Integrated Power Systems (LIPS) has been developed. For example, ON Semiconductor has published a GreenPoint reference design, certain selected portions of which are shown in FIG. 1. In particular, the LIPS architecture of FIG. 1 comprises: An A/C line source 10; an EMI filter 20; a full wave rectifier 30; a PFC circuit 40; a switching network 50; a transformer 60; a backlight controller 70; current sensing and over-voltage detecting circuitry 80; a balancing network 90; a plurality of luminaires 100, each illustrated without limitation as a CCFL; and a plurality of isolation circuits 110. PFC circuit 40 comprises a transformer, a PFC controller, a resistor, an electronically controlled switch, a diode and an output capacitor. Switching network 50 comprises a plurality of electronically controlled switches, illustrated, without limitation, as NMOSFETs. Transformer 60 exhibits a single primary winding magnetically coupled to a pair of secondary windings. Current sensing and over-voltage detecting circuitry 80 comprises a pair of capacitor voltage dividers connected to a secondary side common point, and a resistor connected between the two secondary windings and the secondary side common point. Balancing network 90 comprises a plurality of balancing transformers, each associated with a particular luminaire 100. Balancing network 90 is arranged so that current is received at one end of each luminaire 100 via a respective balancing transformer primary winding, and the secondary windings of the balancing transformers are connected to form an in-phase closed loop. The arrangement of balancing network 90 is further taught in U.S. Pat. No. 7,242,147 issued Jul. 10, 2007 to Jin, the entire contents of which is incorporated herein by reference. In an exemplary embodiment, backlight controller 70 is constituted of an LX 6503 Backlight Controller available from Microsemi Corporation, Garden Grove, Calif. The second end of each luminaire 100 is connected to the secondary side common point.

The output of A/C line source 10 is received by EMI filter 20, and the output of EMI filter is connected to the input of full wave rectifier 30. The output of full wave rectifier 30 is fed to PFC circuit 40, and the output of PFC circuit 40 is fed to switching network 50. The output of switching network 50 is connected to the primary winding of transformer 60, and the secondary windings of transformer 60 are connected to each of the plurality of CCFL lamps constituting luminaires 100 via balancing network 90. The current sense output of current sensing and over-voltage detecting circuitry 80 is connected to a respective input of backlight controller 70, and the over-voltage detecting output of current sensing and over-voltage detecting circuitry 80 is connected to a respective input of backlight controller 70. A PWM dimming input, denoted PWM DIM, an analog dimming input, denoted ANALOG DIM, an enable input, denoted ENABLE, and a synchronization input, denoted SYNCH, preferably sourced by a separate video processor (not shown), are further fed to respective inputs of backlight controller 70. The in-phase closed loop formed by the secondary windings of the balancing transformers of balancing network 90 is also coupled to a respective input of backlight controller 70. Backlight controller 70 exhibits a plurality of outputs, which are each fed via a respective isolation circuit 110 to the control input of the respective electronically controlled switch of switching network 50.

Switching network 50 is preferably a full bridge network comprising 4 electronically controlled switches. The full bridge network can be replaced with a half bridge switching work, thereby reducing cost, however there is often a penalty of severe ringing at turn off due to the hard switching behavior with resulting high switching losses and strong EMI emissions. These problems can be mitigated with additional circuitry; however this again increases the cost. Alternatively, a resonant half bridge switching method may be implemented; however resonant operation varies the switching frequency with operating conditions which is not favored in many display applications.

The output of PFC circuit 40 is normally in the range of 375V to 400 VDC, and in the LIPS architecture of FIG. 1, this voltage is directly used to drive the primary winding of transformer 60 responsive to switching network 50, without requiring a voltage step down. This approach thus provides significant cost savings and efficiency improvements as opposed to earlier prior art applications because of the removal of the DC to DC converter stage for the inverter input.

One of the challenges of the LIPS architecture of FIG. 1 is the safety isolation requirement. In particular, PFC circuit 40 is on the mains input side whereas backlight controller 70 and the respective input signals for backlight controller 70 are on the secondary side of transformer 60, and an electrical insulation of >3750 VRMS between the two sides is mandatory for consumers' safety. Advantageously, backlight controller 70 thus does not require isolation for the feedback signals from current sensing and over-voltage detecting circuitry 80, nor is isolation required for any of the PWM dimming input, analog dimming input, enable input and synchronization input signals received from the video processor. Transformer 60 provides the required isolation between PFC circuit 40 and the circuitry associated with backlight controller 70.

The LIPS architecture of FIG. 1 however exhibits costly isolation circuitry between backlight controller 70 and switching network 50, since the signals driving each of the electronically controlled switches of switching network 50 must be driven with relatively sharp edges, and with sufficient drive current to ensure rapid opening and closing of the electronically controlled switch. Isolation circuits 110 are thus typically implemented with isolation transformers or high speed photo couplers, which are quite costly as compared with low speed opto-isolators which, if used in such an implementation, would produce significant distortions to the rising and falling edges of the high speed signals.

SUMMARY

Accordingly, it is a principal object of the present embodiments to overcome at least some of the disadvantages of the prior art. This is provided in certain embodiments by an arrangement in which a backlight controller is provided associated with the PFC circuit side of an isolating transformer. Feedback signals from the backlight constituent luminaires, and signals from the video processor are passed through respective isolating circuits and fed to the backlight controller.

Advantageously, each of the feedback signal and the signals from the video processor are passed through low cost isolating circuits, since there is preferably no requirement for sharp driving edges. Thus, the total cost of the arrangement is preferably reduced as compared to prior art arrangements.

Additionally, by controlling the luminaire current in cooperation with the PFC voltage regulation, a half bridge circuit can be operated at near full duty condition to achieve similar soft switching performance as a full bridge circuit enjoys, thus providing another level of cost savings.

In certain embodiments a lighting arrangement is provided, the lighting arrangement comprising: a power factor correction circuit; a lighting controller operative at an electrical potential consonant with the electric potential of the output of the power factor correction circuit; a switching network, coupled to the output of the power factor correction circuit and to respective outputs of the lighting controller; a transformer, a primary winding of the transformer coupled to the output of the switching network; and at least one luminaire coupled to at least one secondary winding of the transformer and arranged to be driven by the at least one secondary winding, the lighting controller operative to control the switching network via the respective outputs to switchably pass current from the power factor correction circuit through the primary winding, thereby powering the at least one luminaire.

In one embodiment the control inputs of the switching network are directly connected to respective outputs of the lighting controller. In another embodiment the power factor correction circuit comprises a power factor correction controller, the power factor correction controller arranged to adjust the voltage output of the power factor correction circuit responsive to the lighting controller. In one further embodiment, the lighting arrangement further comprises a voltage sense dividing network arranged across the output of the power factor correction circuit, the voltage sense dividing circuit in communication with the power factor correction controller. In another further embodiment the switching network is constituted of a half bridge network and wherein the lighting controller is operative to control each of the electronically controlled switches forming the half bridge network with a deadtime of a duration such that voltage across each of the electronically controlled switches is no more than 1 volt when the respective electronically controlled switch is switched from an open state to a closed state. Preferably, the half bridge network is constituted of a first electronically controlled switch and a second electronically controlled switch, and wherein the lighting controller is operative to control the first and second electronically controlled switches so as to provide: a first period wherein the first electronically controlled switch is closed and the second electronically controlled switch is open; a dead time during which both the first and the second electronically controlled switches are open; and a second period wherein the first electronically controlled switch is open and the second electronically controlled switch is closed, wherein the combination of the first period and the second period constitutes at least 70% of each complete cycle.

In one embodiment the lighting arrangement further comprising a current sensor in communication with the lighting controller, the current sensor arranged to detect current flowing in the primary winding. In another embodiment the lighting arrangement further comprises a current sensor in communication with the lighting controller, the current sensor arranged to detect current flowing through at least a portion of the switching network. In yet another further embodiment the luminaire is one of a fluorescent lamp and a light emitting diode.

Independently, in certain embodiments a method of backlighting is provided, the method comprising: providing a direct current power at a voltage in excess of 24 volts; providing a lighting controller, the provided lighting controller operative without electrical isolation from the provided direct current power; and alternately switching the provided direct current power through a transformer primary winding responsive to the provided lighting controller.

In one embodiment the method further comprises adjusting the voltage of the direct current power responsive to the provided lighting controller. In one further embodiment the alternately switching is accomplished through a half bridge network and where the alternately switching is arranged to provide soft switching through the half bridge network. In another further embodiment the alternately switching is accomplished through a half bridge network comprising a plurality of constituent switches, and wherein the alternately switching is at a minimum of a 35% duty cycle for each of the constituent switches of the half bridge network. In yet another further embodiment the alternately switching is provided via a first and a second electronically controlled switch, and wherein the alternately switching comprises: providing a first period wherein the first electronically controlled switch is closed and the second electronically controlled switch is open; providing a dead time during which both the first and the second electronically controlled switches are open; and providing a second period wherein the first electronically controlled switch is open and the second electronically controlled switch is closed, wherein the deadtime is of a duration such that voltage across each of the first and second electronically controlled switches drops to near zero when the respective electronically controlled switch is switched from an open state to, a closed state. In one yet further embodiment the first and second periods in combination constitute at least 70% of each complete cycle. In another yet further embodiment the duty cycle of the first and second switches are independently varied.

In one embodiment the method further comprises: detecting an indication of current flowing in the transformer primary winding; and feeding the detected indication to the provided lighting controller. In another embodiment the method further comprises: providing a switching network, the provided switching network associated with the alternately switching of the provided direct current power; detecting an indication of current flowing through at least a portion of the provided switching network; and feeding the detected indication to the provided lighting controller.

In one embodiment the method further comprises deriving a wake up signal from a dimming control signal. In another embodiment the method further comprises: providing the transformer, the provided transformer comprising the primary winding and a second winding magnetically coupled to the primary winding; and providing a luminaire coupled to the secondary winding of the provided transformer, wherein the alternately switching of the provided direct current power through the transformer primary winding illuminates the luminaire.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
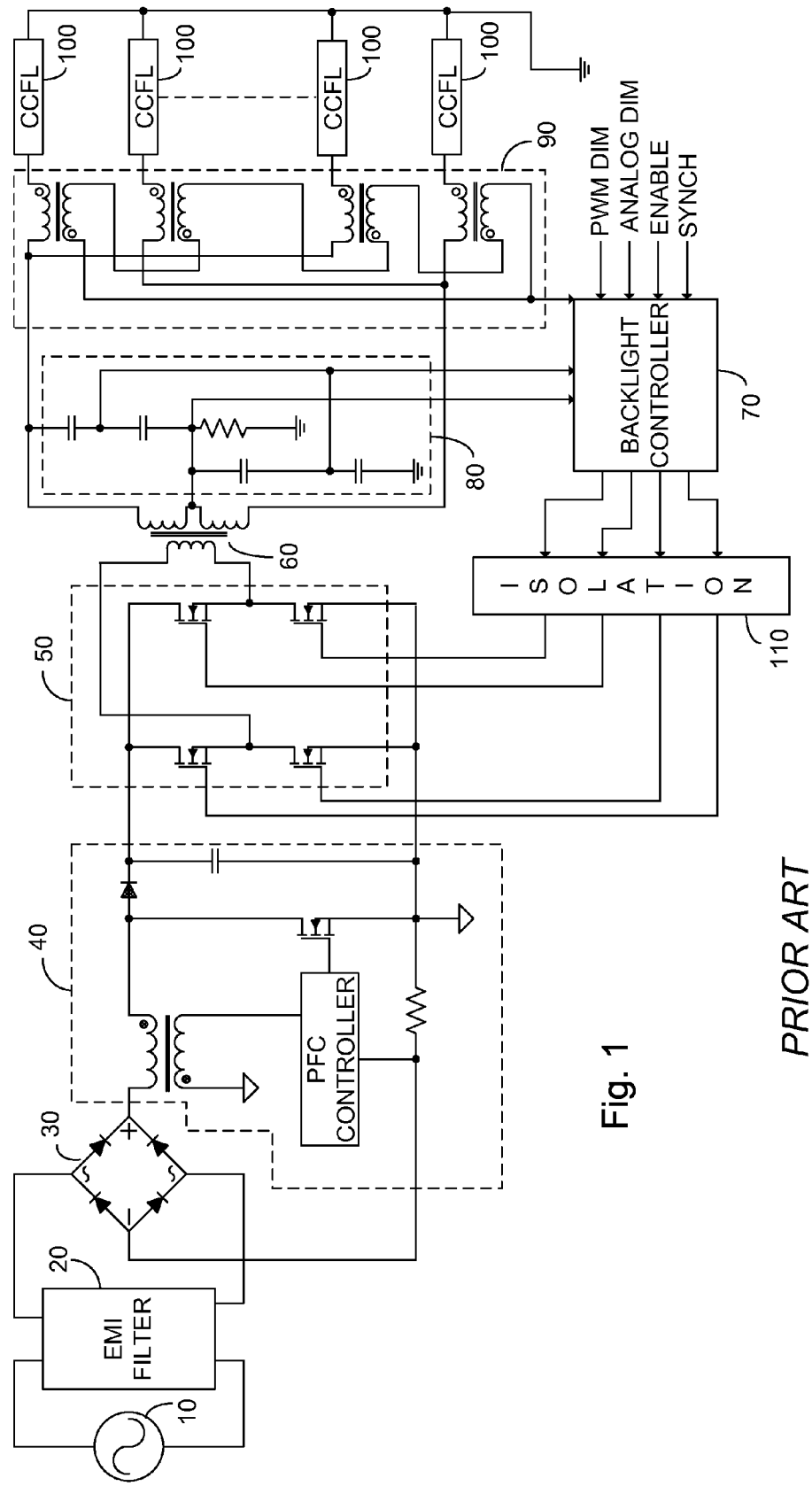
FIG. 1 illustrates a high level schematic diagram of a LIPS driving arrangement according to the prior art, in which a backlight controller is provided associated with the secondary side of a driving transformer.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2:
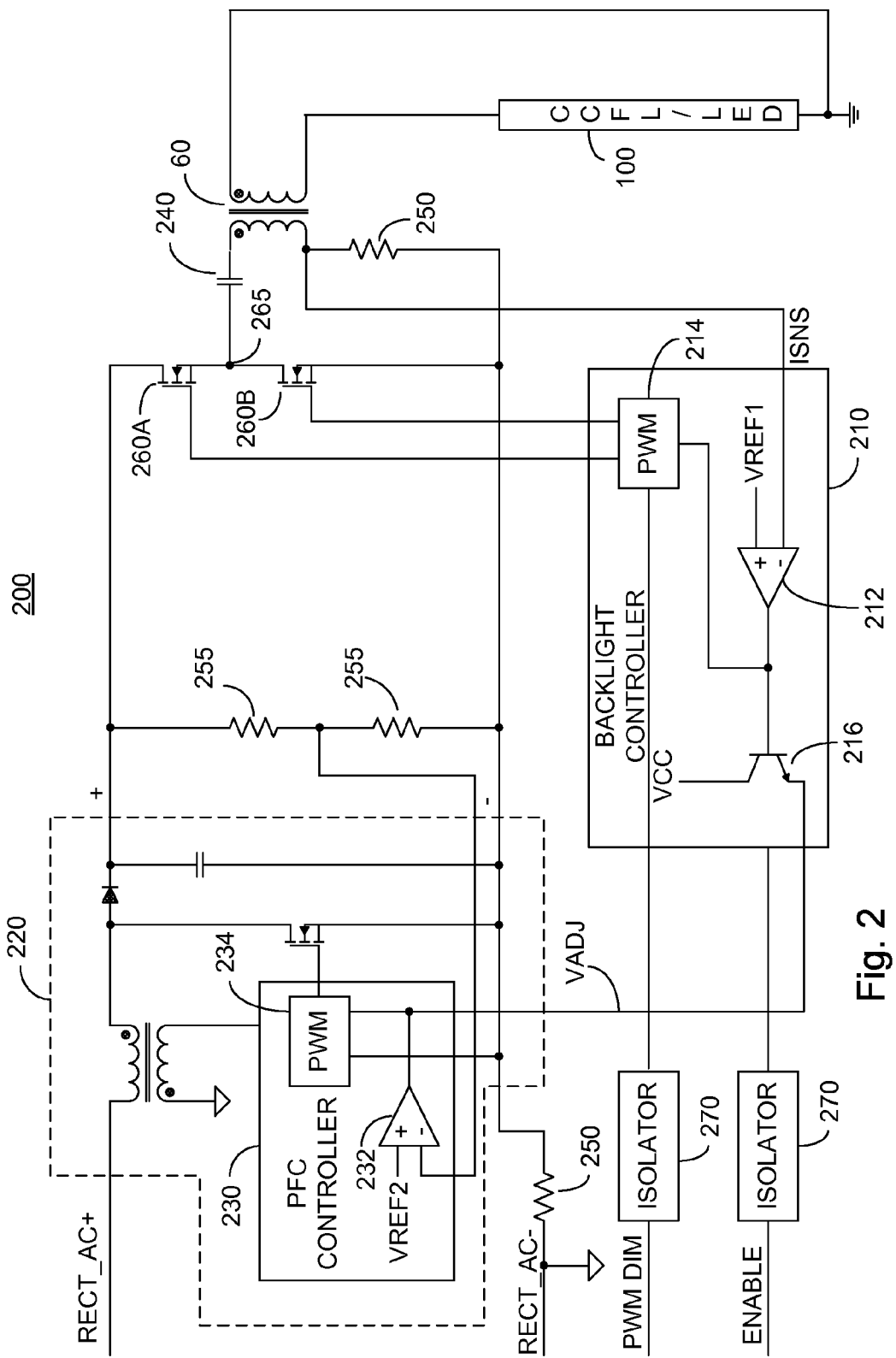
FIG. 2 illustrates a high level schematic diagram of an embodiment of a driving arrangement in which a backlight controller is provided associated with the PFC circuit side of a driving transformer, wherein current sensing is accomplished in series with the primary winding of the isolation transformer.

FIG. 2 illustrates a high level schematic diagram of an embodiment of a driving arrangement 200 in which a backlight controller 210 is provided associated with the PFC circuit side of an isolating transformer, wherein current sensing is accomplished in series with the primary winding of the isolation transformer. Driving arrangement 200 comprises: a backlight controller 210 exhibiting an error amplifier 212, a PWM controller 214 and a driving amplifier 216 illustrated without limitation as a bipolar transistor; a PFC circuit 220 comprising a PFC controller 230 exhibiting an error amplifier 232 and a PWM controller 234; a DC blocking capacitor 240; a first and a second current sense resistor 250; a first and a second voltage sense resistor 255; a first and a second electronically controlled switch 260, denoted respectively as electronically controlled switches 260A and 260B, illustrated without limitation as NMOSFET switches; a switching node 265; a first and a second isolation circuit 270; a transformer 60; and a luminaire 100, illustrated without limitation as one of a CCFL or an LED string. Only a single luminaire 100 is illustrated for simplicity, however it is to be understood that a plurality of luminaires 100, preferably with an associated balancing network, as described above in relation to FIG. 1 may be supplied without exceeding the scope. For ease of understanding the operation of luminaire 100 will be described in relation to a CCFL embodiment, however this is not meant to be limiting in any way, and the principles of the current embodiments are equally applicable to an LED embodiment.

PFC circuit 220 is arranged to receive a rectified AC current at a first terminal denoted RECT_AC+, as described above in relation to FIG. 1, and return the current via first current sense resistor 250 to a second terminal denoted RECT_AC−. The positive output of PFC circuit 220 is connected to the drain of first electronically controlled switch 260A and to a first end of first voltage sense resistor 255. The source of first electronically controlled switch 260A is connected to the drain of second electronically controlled switch 260B defining switching node 265, and via DC blocking capacitor 240 to a first end of the primary winding of transformer 60. The second end of the primary winding of transformer 60 is connected to the first end of second current sense resistor 250 and to an input of backlight controller 210, denoted ISNS, which is connected to the inverting input of error amplifier 214. The source of second electronically controlled switch 260B is connected to the second end of second current sense resistor 250, to a first end of second voltage sense resistor 255, and to the return of PFC circuit 220, which is connected to a first input of PWM controller 234. The second end of each of first and second voltage sense resistors 255 are connected together to the inverting input of error amplifier 232.

The secondary winding of transformer 60 is connected across luminaire 100, and one end of the secondary winding of transformer 60 is further connected to a secondary side common potential.

The non-inverting input of error amplifier 212 is connected to a first reference voltage, denoted VREF1, and the output of error amplifier 212 is connected to an input of PWM controller 214 and to the base of driving amplifier 216. The gates of each of first and second electronically controlled switches 260A and 260B are connected to respective outputs of backlight controller 210, and in particular to outputs of PWM controller 214. An enable input, denoted ENABLE, sourced by a video controller (not shown), is isolated by first isolation circuit 270 and fed to an input of backlight controller 210. A PWM dimming input, denoted PWM DIM, sourced by a video controller (not shown), is isolated by second isolation circuit 270 and fed to an input of backlight controller 210, and in particular to PWM controller 214. Advantageously, PWM DIM is a low frequency burst dimming signal, at about 150-250 Hz, which is easily passed by low cost opto-isolating circuitry implementing second isolation circuit 270. Similarly, ENABLE is a low frequency signal easily passed by low cost opto-isolating circuitry implementing first isolation circuit 270.

An output of backlight controller 210, particularly the emitter of driving amplifier 216 is fed to a control input of PFC controller 230, denoted VADJ, connected in particular to the output of error amplifier 232 and to a second input of PWM controller 234. The non-inverting input of error amplifier 232 is connected to a second reference voltage, denoted VREF2. The output of PWM controller 234 is connected to the gate of an electronically controlled switch of PFC circuit 220.

In operation, driving arrangement 200 uses a half bridge configuration constituted of first and second electronically controlled switches 260A and 260B, where first electronically controlled switch 260A is thus associated with the positive power rail of PFC circuit 220 and second electronically controlled switch 260B is associated with the return power rail of PFC circuit 220. Backlight controller 210 is connected at the primary side of transformer 60, and is thus operative at an electric potential consonant with the output of PFC circuit 220. The outputs of backlight controller 210 driving first and second electronically controlled switches 260 are preferably directly connected, and in particular do not require electrical isolation. Current feedback received at input ISNS is provided by second current sense resistor 250 in series with the primary winding of transformer 60.

First and second voltage sense resistors 255 form a voltage sense dividing network across the output of PFC circuit 220, which is fed to PFC controller 230, and in particular to error amplifier 232. A fine tuning signal is provided from backlight controller 210, responsive to the output of error amplifier 212, and fed to input VADJ of PFC controller 230, which adjusts the output of error amplifier 232. PFC controller 230 is operative responsive to input VADJ to adjust the target output voltage of PFC circuit 220.

Figure 5A:
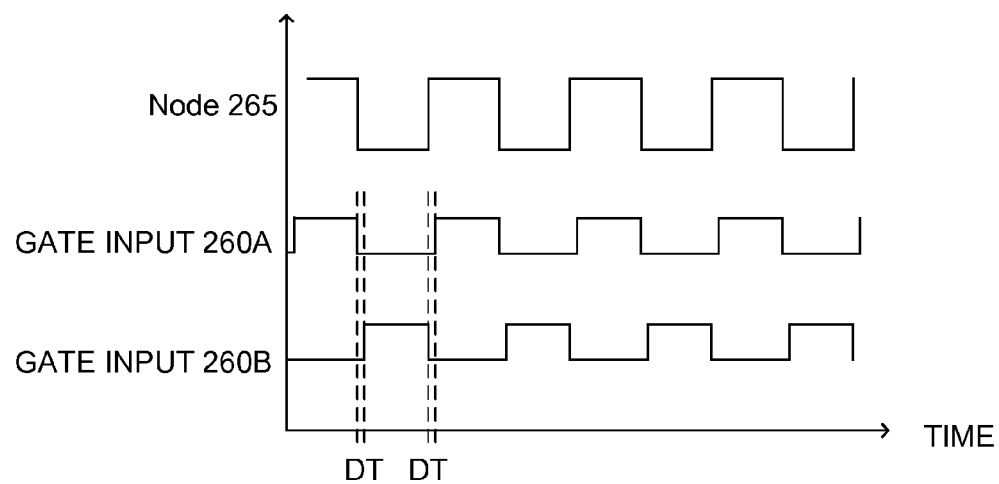
FIG. 5A illustrates a timing diagram of certain signals of the driving arrangements of FIGS. 2 and 3 under normal steady state operation.

In one embodiment, the half bridge inverter of driving arrangement 200 operates at a maximum duty cycle at a fixed luminaire current setting. First and second electronically controlled switches 260A and 260B turn on and off alternately, responsive to backlight controller 210, each at nearly 50% duty cycle, with a small dead time, denoted DT, during which both electronically controlled switches are open, inserted at the switch over transitions, as illustrated in FIG. 5A, where the x-axis represents time and the y-axis represents amplitude in arbitrary values for each of the respective gate voltages, and for the voltage at node 265. Such operation can achieve a soft switching operation and therefore additional diodes normally required in half bridge operation are not required, since as illustrated each of the respective switches 260A, 260B switch to, or from, an open to a closed state when the voltage across the switch is near zero, typically defined as no more than 1 volt, without limitation. Preferably, the fixed dead time DT is selected such that soft switching operation is achieved. The term soft switching is meant to include operation wherein the voltage drop across each of first and second electronically controlled switches 260A, 260B is nearly zero when the switch is transitioned from an open state to a closed state. The above has been described at nearly 50% duty cycle however duty cycles as low as 35% are achievable without exceeding the scope.

In most prior art backlight applications the steady state luminaire current is set at a fixed optimum level and brightness control is accomplished by burst dimming in which luminaires 100 are turned on and off at a fixed low frequency of about 150 Hz to 250 Hz with variable on duty. Since the output voltage of PFC circuit 220 is a stable regulated voltage, the desired current for luminaire 100, or luminaires 100, can be obtained at a fixed near full duty cycle by selecting the relevant design parameters such as the transformer turns ratio. In such an embodiment, ISNS is not necessarily required.

In some applications tight luminaire current control is required and the actual luminaire current variation with related factors such as, without limitation, temperature of the luminaire and manufacturing tolerance of the components may exceed the specification requirement. Under such circumstances, closed loop control of the luminaire current is preferred. This is achieved in driving arrangement 200 by sensing the current through the primary winding of transformer 60 via second current sense resistor 250, and feeding the sensed current indication to backlight controller 210 at input ISNS. Backlight controller 210 is operative to adjust the output voltage of PFC circuit 220 via signal VADJ fed to PFC controller 230 responsive to input ISNS. Thus, the half bridge operation of first and second electronically controlled switches 260A, 260B is maintained at near full duty switching, with correction and control accomplished by adjustment of the output voltage of PFC circuit 220. In an exemplary embodiment, an adjustment range of 10% of the output voltage of PFC circuit 220 is sufficient to compensate for the above mentioned factors. In one particular embodiment, a variation of the output voltage of PFC circuit 40 from 375V to 425V provides sufficient range for luminaire current fine tuning. In such an embodiment, PWM controller 214 outputs a fixed, near 50% duty signal and is not responsive to the output of error amplifier 212, except as described below in relation to burst dimming. Alternatively, the luminaire current can also be fine tuned by varying the PWM duty in a small range of about 35% to 50%, since with the large leakage inductance of transformer 60 soft switching operation can normally be maintained in such a duty range. A significantly smaller duty cycle would however result in hard switching. The above cited range is an indicative figure and in reality depends on the actual design parameters. Combining both PFC voltage control and fine tuning of the PWM duty cycle, each restricted to be over the respective controlled range, further extends the adjustable range of the luminaire current.

It is to be understood that the above depiction does not describe each and every connection of a PFC circuit. In particular, for simplicity and ease of understanding, the voltage sense circuit feed in which allows the PFC circuit to maintain the current in phase with the voltage is not depicted.

Figure 5B:
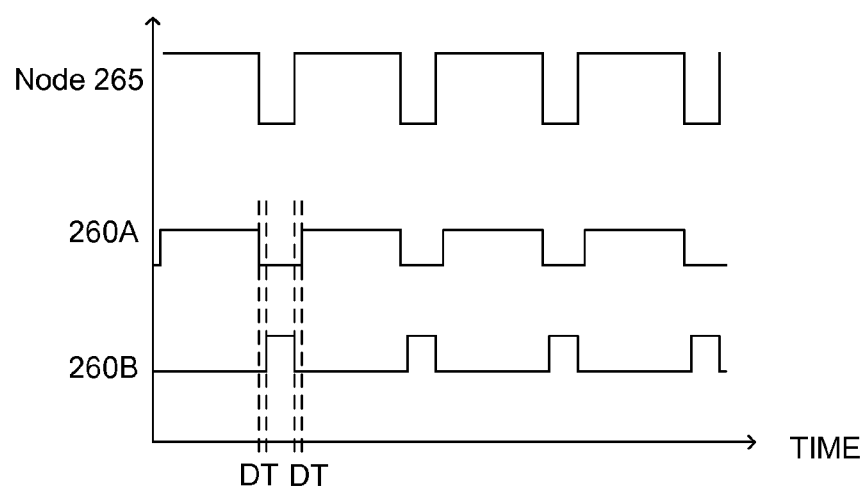
FIG. 5B illustrates a timing diagram of certain signals of the driving arrangements of FIGS. 2 and 3 during a portion of the rise and fall period of burst dimming operation.

When performing burst dimming, the luminaire current is preferably controlled to rise gradually from zero to the set value when it is turned on, and fall gradually to zero when it is turned off, in order to minimize the audible noise at the dimming frequency. During the rise and fall period, the combination of fixed near full duty cycle and limited PFC voltage adjustment range is typically not sufficient to satisfy the luminaire current control range at small luminaire current amplitudes, particularly for CCFL embodiments. In order to extend the luminaire current control range, the half bridge preferably enters an asymmetric half bridge operation. In such operation the PWM duty cycle of one electronically controlled switch, e.g. first electronically controlled switch 260A, reduces from near 50% to a lower duty cycle to bring down the luminaire current, and the other electronically controlled switch, e.g. second electronically controlled switch 260B, increases its duty accordingly to maintain the complementary switching state relation. First and second electronically controlled switches 260A and 260B turn on and off alternately, responsive to backlight controller 210, at the respective complementary unequal duty cycles, with a small dead time, denoted DT, during which both electronically controlled switches are open, inserted at the switch over transitions, as illustrated in FIG. 5B, where the x-axis represents time and the y-axis represents amplitude in arbitrary values for each of the respective gate voltages and for the voltage at node 265. With proper selection of dead time DT such operation maintains the soft switching feature of the half bridge operation, which requires complimentary switching states of the two switches, while luminaire current control is accomplished by varying the PWM duty cycle.

In one embodiment, the amplitude of the positive and negative half cycle of the luminaire voltage and current waveform will not be symmetric with asymmetric half bridge switching. However, the total area of the positive and negative half cycle waveform is equal, and therefore such operation will not cause any DC bias problem to the luminaires.

Thus, the half bridge circuit of driving arrangement 200 achieves soft switching performance similar to a full bridge while providing luminaire current regulation for dimming. As described above, first and second electronically controlled switches 260 operate at near full duty during steady state operation and luminaire current regulation is achieved by adjusting the output voltage of PFC circuit 220. The luminaire current rising and falling slope during burst dimming is controlled by asymmetric half bridge PWM switching. Advantageously, first and second electronically controlled switches 260 are driven directly by backlight controller 210 thus saving on external gate drive components.

A further advantage of driving arrangement 200 is that luminaire current feedback from the transformer secondary side is not required. Since the transformer secondary side common potential is typically tied to the chassis and to the low voltage signal ground, transmitting the luminaire current signal, which is in an analog format, across the insulation barrier to the controller side is costly. It is to be understood that the current signal received at ISNS from the primary winding of transformer 60 contains the transformer magnetizing current which could affect the accuracy of the luminaire current regulation. However, since the inverter preferably operates at a fixed near full duty cycle at steady state with small variations in input voltage, and the luminaire current is also set at a fixed level at steady state, the effect of the magnetizing current can be compensated for with a pre-offset. Advantageously, primary fault conditions such as a transformer winding short can be detected with feedback signal ISNS, which is not the case with secondary side sensing.

Figure 3:
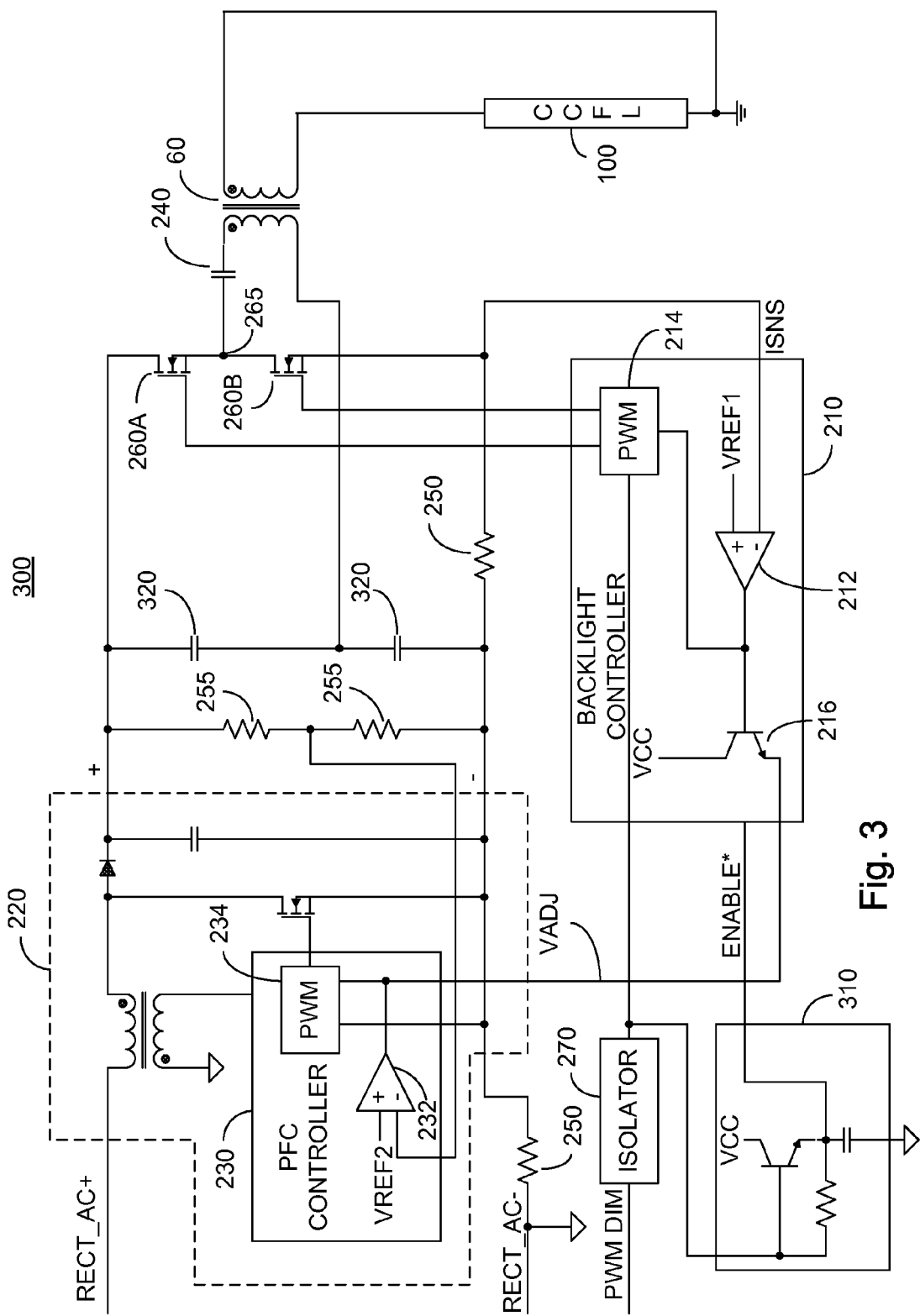
FIG. 3 illustrates a high level schematic diagram of an embodiment of a driving arrangement in which a backlight controller is provided associated with the PFC circuit side of a driving transformer, wherein current sensing is accomplished in series with the return side of the PFC circuit.

FIG. 3 illustrates a high level schematic diagram of an embodiment of a driving arrangement 300 in which a backlight controller 210 is provided associated with the PFC circuit side of an isolating transformer, wherein current sensing is accomplished in series with the return side of the PFC circuit. Driving arrangement 300 comprises: a backlight controller 210 exhibiting an error amplifier 212, a PWM controller 214 and a driving amplifier 216 illustrated without limitation as a bipolar transistor; a PFC circuit 220 comprising a PFC controller 230 exhibiting an error amplifier 232 and a PWM controller 234; a DC blocking capacitor 240; a first and a second current sense resistor 250; a first and a second voltage sense resistor 255; a first and a second electronically controlled switch 260, denoted respectively electronically controlled switches 260A and 260B, illustrated without limitation as NMOSFET switches; a switching node 265; an isolation circuit 270; a wake up circuit 310 illustrated without limitation as a bipolar transistor, capacitor and resistor; a first and a second capacitor 320; a transformer 60; and a luminaire 100, illustrated without limitation as a CCFL. Only a single luminaire 100 is illustrated for simplicity, however it is to be understood that a plurality of luminaires 100, preferably with an associated balancing network, as described above in relation to FIG. 1 may be supplied without exceeding the scope.

PFC circuit 220 is arranged to receive a rectified AC current at a first terminal denoted RECT_AC+, as described above in relation to FIG. 1, and return the current via first current sense resistor 250 to a second terminal denoted RECT_AC−. The positive output of PFC circuit 220 is connected to the drain of first electronically controlled switch 260A, to a first end of first voltage sense resistor 255 and to a first end of first capacitor 320. The source of first electronically controlled switch 260A is connected to the drain of second electronically controlled switch 260B defining switching node 265, and via DC blocking capacitor 240 to a first end of the primary winding of transformer 60. The second end of the primary winding of transformer 60 is connected to a second end of first capacitor 320 and to a first end of second capacitor 320. The source of second electronically controlled switch 260B is connected to the first end of second current sense resistor 250 and to an input of backlight controller 210, denoted ISNS, which is connected to the inverting input of error amplifier 212. The second end of second current sense resistor 250 is connected to the second end of second capacitor 320, to a first end of second voltage sense resistor 255 and to the return of PFC circuit 220, which is connected a first input of PWM controller 234. The second end of each of first and second voltage sense resistors 255 are connected together to the inverting input of error amplifier 232.

The secondary winding of transformer 60 is connected across luminaire 100, and one end of the secondary winding of transformer 60 is further connected to a secondary side common potential.

The non-inverting input of error amplifier 212 is connected to a first reference voltage, denoted VREF1, and the output of error amplifier 212 is connected to the input of PWM controller 214 and to the base of driving amplifier 216. The gates of each of first and second electronically controlled switches 260A, 260B are connected to respective outputs of backlight controller 210, and in particular to outputs of PWM controller 214. A PWM dimming input, denoted PWM DIM, sourced by a video controller (not shown), is isolated by isolation circuit 270 and fed to an input of backlight controller 210, and in particular to PWM controller 214 and to the input of wake up circuit 310. Advantageously, PWM DIM is a low frequency burst dimming signal, at about 150-250 Hz, which is easily passed by low cost opto-isolating circuitry implementing isolation circuit 270. The output of wake up circuit 310 is connected to the enable input of backlight controller 210, denoted ENABLE*.

An output of backlight controller 210, particularly the emitter of driving amplifier 216, is fed to a control input of PFC controller 230, denoted VADJ, connected in particular to the output of error amplifier 232 and to a second input of PWM controller 234. The non-inverting input of error amplifier 232 is connected to a second reference voltage, denoted VREF2. The output of PWM controller 234 is connected to an electronically controlled switch of PFC circuit 220.

In operation, driving arrangement 300 is in all respects similar to driving arrangement 200, with the exception that second sense resistor 250 is inserted in the return path to PFC circuit 220. In such an arrangement, a fault from first and second electronically controlled switches 260A, 260B can also be detected at input ISNS because the fault current will pass through second sense resistor 250. Additionally, the enable signal from the video controller is not transmitted. Instead, the existence of a valid PWM DIM signal is used to wake up backlight controller 210 via wake up circuit 310. In particular, in the presence of a valid PWM DIM signal, the capacitor of wake up circuit 310 is charged setting input ENABLE* active thereby turning on backlight controller 210. Advantageously, only a single low cost isolating circuit 270 is required. In the absence of a valid PWM DIM signal, the capacitor of wake up circuit 310 will discharge, and backlight controller 210 will be shut down by an inactive signal at the ENABLE* input.

In another embodiment, the ENABLE* input of backlight controller 210 is tied to an active level, and backlight controller 210 is controlled only by the burst dimming signal PWM DIM. The luminaire current will be cut off when the PWM DIM signal is at an inactive level. The price paid for this simplicity is an increased power consumption for backlight controller 210, since backlight controller 210 will remain in a powered standby mode at all times due to the lack of an actual controlled ENABLE* signal.

Driving arrangements 200 and 300 have been illustrated with a current sense resistor 250 associated with current sensing input ISNS, however this is not meant to be limiting in any way. In some applications a wider luminaire current tolerance is allowed and satisfactory luminaire current accuracy can be obtained by a fixed PWM duty cycle at a fixed input voltage with a proper transformer design. Under such circumstances a current feedback circuit is not required and the luminaire current will be controlled in an open loop manner by an accurate setting of the PWM duty, which is near full duty cycle, i.e. a 50% duty cycle less dead time DT. This approach further reduces design complexity and system cost.

Figure 4:
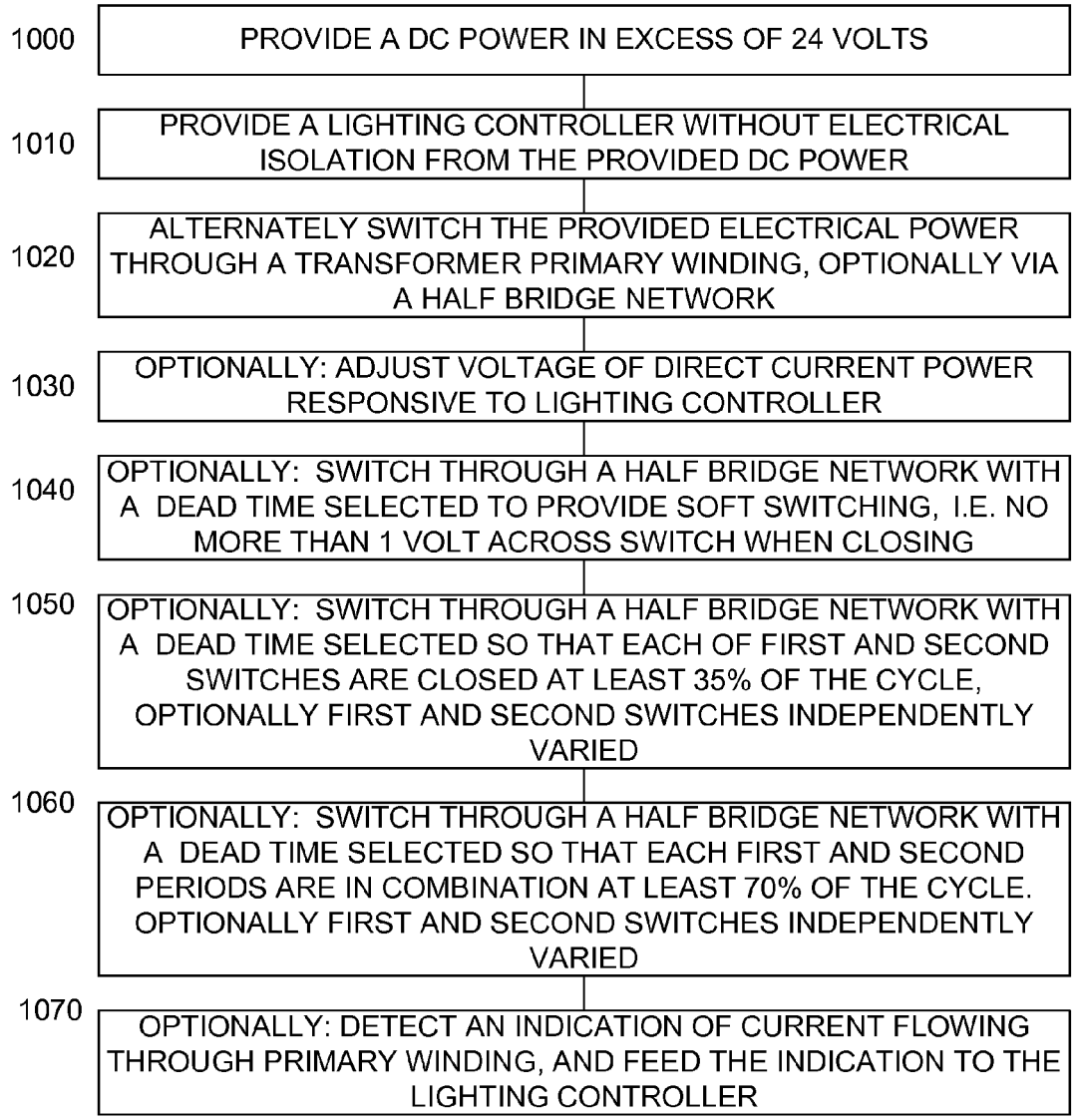
FIG. 4 illustrates a high level flow chart of a method of the backlight controller of FIGS. 2 and 3.

FIG. 4 illustrates a high level flow chart of a method of backlight controller 210 of FIGS. 2 and 3. As described above, backlight controller 210 is a particular embodiment of a general lighting controller. In stage 1000, a DC power is provided in excess of 24 volts. In stage 1010, a lighting controller, such as backlight controller 210 is provided, the lighting controller not being electrically isolated from the provided DC power of stage 1000. In stage 1020, the provided electrical power of stage 1000 is alternately switched through a transformer primary winding. Optionally, the switching is via a half bridge network, constituted of a first and a second electronically controlled switch, responsive to the provided lighting controller of stage 1010.

In optional stage 1030, the voltage of the DC power is adjusted responsive to the provided lighting controller of stage 1010. In optional 1040, the switching of stage 1020 is accomplished by a half bridge network with a dead time selected to provide soft switching, i.e. switching wherein voltage across the switch is about zero volts, specifically no more than 1 volt, when the electronically controlled switch transitions from an open state to a closed state. In optional stage 1050, the switching of stage 1020 is accomplished by a half bridge network with a dead time selected wherein each of the electronically controlled switches of the half bridge network are closed for at least 35% of the total cycle time. Further optionally, the open and close time of the switches may be separately varied, as described above in relation to FIG. 5B. The dead time prevents a phenomenon known as "shoot through", in which the first and second electronically controlled switches are both conducting simultaneously due to the finite delay of the turn off operation of the switch. The dead time further provides for a transition time allowing the potential across the switch to swing down to the ground level when the switching state of the first period changes to the second period to allow zero voltage turn on of the second switch, thus achieving a soft switching operation. Vice versa, a dead time is also inserted at the transition from the second period to the first period for the same purpose. In an exemplary embodiment, a total duty of period one and period two exceeding 70% is sufficient to achieve soft switching in CCFL inverter applications. Thus, the term near 50% duty cycle as used herein is meant to mean a duty cycle meeting or exceeding 35% on average for each of the two switches in the half bridge.

In optional stage 1060, the switching of stage 1020 is accomplished by a half bridge network with a dead time selected so that the combination of the first and said switch closed time is at least 70%. Further optionally, the open and close time of the switches may be separately varied, as described above in relation to FIG. 5B.

In optional stage 1070, an indication of the current flowing through the primary winding of stage 1020 is detected and fed to the lighting controller of stage 1010.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

I claim:

1. A lighting arrangement comprising:
a power factor correction circuit comprising a power factor correction controller;
a lighting controller operative at an electrical potential consonant with the electric potential of the output of said power factor correction circuit, said power factor correction circuit responsive to said lighting controller;
a switching network, coupled to the output of said power factor correction circuit and to respective outputs of said lighting controller, said switching network constituted of a half bridge network;
a transformer, a primary winding of said transformer coupled to the output of said switching network; and
at least one luminaire coupled to at least one secondary winding of said transformer and arranged to be driven by said at least one secondary winding,
said lighting controller operative to:
control said switching network via said respective outputs to switchably pass current from said power factor correction circuit through said primary winding, thereby powering said at least one luminaire;
adjust the voltage output of said power factor correction circuit; and
control each of the electronically controlled switches forming said half bridge network with a deadtime of a duration such that voltage across each of the electronically controlled switches is no more than 1 volt when the respective electronically controlled switch is switched from an open state to a closed state.

2. The lighting arrangement according to claim 1, wherein said control inputs of said switching network are directly connected to respective outputs of said lighting controller.

3. The lighting arrangement according to claim 1, further comprising a voltage sense dividing network arranged across the output of said power factor correction circuit, said voltage sense dividing circuit in communication with said power factor correction controller.

4. The lighting arrangement according to claim 1, wherein said half bridge network is constituted of a first electronically controlled switch and a second electronically controlled switch, and wherein said lighting controller is operative to control said first and second electronically controlled switches and adjust the voltage output of said power factor correction circuit so as to provide:
a first period wherein said first electronically controlled switch is closed and said second electronically controlled switch is open;
a dead time during which both said first and said second electronically controlled switches are open; and
a second period wherein said first electronically controlled switch is open and said second electronically controlled switch is closed,
wherein the combination of said first period and said second period constitutes at least 70% of each complete cycle.

5. The lighting arrangement according to claim 1, further comprising a current sensor in communication with said lighting controller, said current sensor arranged to detect current flowing in said primary winding.

6. The lighting according to claim 1, further comprising a current sensor in communication with said lighting controller, said current sensor arranged to detect current flowing through at least a portion of said switching network.

7. The lighting according to claim 1, wherein said luminaire is one of a fluorescent lamp and a light emitting diode.

8. The lighting arrangement according to claim 1, wherein said adjustment of the voltage output of said power factor correction circuit is within a predetermined adjustment range.

9. The lighting arrangement according to claim 8, wherein the predetermined adjustment range is about 10%.

* * * * *